United States Patent [19]

Bieck

[11] Patent Number: 5,697,593
[45] Date of Patent: Dec. 16, 1997

[54] HOLDING DEVICE FOR DRINK CONTAINER

[75] Inventor: Torsten Bieck, Waldachtal, Germany

[73] Assignee: fischwerke Artur Fischer GmbH & Co. KG, Waldachtal, Germany

[21] Appl. No.: 604,227

[22] Filed: Feb. 22, 1996

[30] Foreign Application Priority Data

Mar. 4, 1995 [DE] Germany ............... 195 07 612.5

[51] Int. Cl.$^6$ .................................................. A47K 1/08
[52] U.S. Cl. ................... 248/311.2; 248/313; 224/926; 224/282
[58] Field of Search ................... 248/309.1, 232, 248/316.5, 313, 316.3, 316.6, 311.2

[56] References Cited

U.S. PATENT DOCUMENTS

| | | | |
|---|---|---|---|
| 4,583,707 | 4/1986 | Anderson | 248/293 |
| 5,280,870 | 1/1994 | Chick et al. | 248/311.2 |
| 5,505,417 | 4/1996 | Plocher | 248/311.2 |
| 5,598,999 | 2/1997 | Plocher et al. | 248/311.2 |

FOREIGN PATENT DOCUMENTS

| | | |
|---|---|---|
| 9016071 | 11/1990 | Germany . |
| 4200823 | 1/1992 | Germany . |
| 4224700 | 7/1992 | Germany . |
| 4306935 | 3/1993 | Germany . |
| 9306415 | 4/1993 | Germany . |
| 9308232 | 6/1993 | Germany . |

OTHER PUBLICATIONS

Patent Abstracts of Japan, vol. 17, No. 652, Mar. 2, 1992.

*Primary Examiner*—Leslie A. Braun
*Assistant Examiner*—Charles J. Hunter
*Attorney, Agent, or Firm*—Michael J. Striker

[57] ABSTRACT

A holding device to receive a drink container is provided for installation in a horizontal surface, for example a central console of a motor vehicle. In order to be able to accommodate the holding device in a small installation space and to recess it completely in its installation surface, the invention proposes a pivot arm which, after being unlocked, pivots, actuated by a spring, from a recumbent position into an upright position and thereby displaces a displaceable, upright arm upwards into a holding position. In order, with a narrow installation space, to engage securely around an inserted drink container, the holding device further has holding wings which, during the displacement of the displaceable arm into the holding position pivot out laterally.

10 Claims, 5 Drawing Sheets

HOLDING DEVICE FOR DRINK CONTAINER

BACKGROUND OF THE INVENTION

The present invention relates to a holding device for a drink container, for example a drink can, a beaker or a cup, which can be mounted so as to be recessed in an approximately horizontal surface, for example a central console of a motor vehicle.

A simple holding device of this type is known from U.S. Pat. No. 4,583,707. This has a horizontal holding plate with an opening for the insertion of a drink container. This holding plate is guided, so that it can be lifted away in a vertical direction, on a base plate by means of two laterally arranged scissor guides, each of which has a pair of levers which cross each other and are linked with each other in their center. The base plate is mounted on a horizontal surface of a motor vehicle.

SUMMARY OF THE INVENTION

Accordingly, it is an object of the present invention to provide a holding device for a drink container which is a further improvement of the existing devices.

In keeping with these objects and with others which will become apparent hereinafter, one feature of the present invention resides, briefly stated, in a holding device for a drink container, which has a pivot arm pivotable from a recumbent position into an upright position and which upright position surrounding a portion of a periphery of a drink container inserted into the holding device, and a displaceable arm guided in a guide so as to be displaceable from a recessed position into a holding position in which it stands opposite to the pivot arm and surrounds an opposed portion of the periphery of the drink container inserted into the holding device, and the arms are linked with each other so that the pivot arm during its pivotal movement into the upright position raises the displaceable arm into its holding position.

When the holding device is designed in accordance with the present invention, it can be recessed into an approximately horizontal surface and requires only a small space for installation.

The holding device according to the invention has two arms which can be brought into a position opposite each other in which a drink holder can be inserted between them. The arms engage around the drink container on portions of the periphery lying opposite each other, and hold the drink container securely. The holding device according to the invention has the advantage that it can in particular be made substantially narrower than a drink container to be inserted into it, and nevertheless surrounds the latter over sufficiently large portions of the periphery to hold it securely. In their recessed or recumbent position, the two arms do not project beyond the surface into which the holding device according to the invention is built. The two holding arms are forcibly guided with each other by means of their linkage, so that they always move together. Owing to the forcible guiding of the two arms with each other, it is sufficient to move one of the arms in order to bring the holding device according to the invention into an open position in which a drink container can be inserted into it, or into a position recessed in the installation surface, since the respective other arm always moves with the arm that is being moved.

The two arms need not stand vertically; they can also be adapted obliquely outward to the shape of a conical beaker or, if necessary, obliquely inward. The pivot angle of the pivot arm consequently does not in every case amount to 90°; it may be larger or smaller. It is also possible to install the holding device according to the invention in an inclined surface and, nevertheless, the two arms can be arranged to be brought into a vertical position. In this case also, the pivot angle of the pivot arm is not 90° but more or less, depending on the inclination of the installation surface.

The guide of the displaceable arm need not be straight; it may also follow a curve. In the latter case, the guide is preferably curved in the direction of a pivot axis of the pivot arm, which need not, however, be arranged in the center point of the curve of the guide.

In a further development of the invention, the guide of the displaceable arm, in its central region, runs tangentially to the pivot axis of the pivot arm and thus obliquely in the direction of the pivot arm or its pivot axis downwards from a horizontal setting-down plane for a drink container inserted into the holding device. The result thereby achieved is that the guide extends in its central region in the direction of a notional arc of a circle about the pivot axis of the pivot arm. The angular deviation of the ends of the guide from such an arc of a circle is in this way kept small. Consequently, a force engaging with the displaceable arm during the pivoting of the pivot arm by way of its linkage, acts substantially in the direction of the guide. A force component in a direction transverse to the guide is nil in the central region of the guide and is small at the ends of the guide. The force required to raise and lower the two arms of the holding device according to the invention is in this way kept small and, in particular, jamming of the displaceable arm in its guide is avoided.

In order to be able to make the holding device according to the invention as narrow as possible and nevertheless surround a drink container inserted into it over sufficiently large portions of the periphery, in order to hold the drink container securely, the displaceable arm of the holding device according to the invention has two holding wings arranged to be pivoted out to the side. In the holding position of the displaceable arm, these are pivoted outward in such a way that they lie approximately in the peripheral direction of a drink container inserted into the holding device according to the invention. During the movement of the displaceable arm downwards into the recessed position, the holding wings pivot inward, so that they do not project laterally beyond the displaceable arm and, together with the latter, are able to be recessed in an opening in the surface in which the holding device is mounted.

Pivoting-out is preferably effected by means of a control projection on each holding wing, which comes up against a fixed control rib when the displaceable arm is moved upwards into its holding position, and which thereby pivots the respective holding wing outward.

Portions of the lower edges of the holding wings are constructed, in a preferred embodiment of the invention, as return surfaces. These, during the lowering of the displaceable arm, slide along on fixed complementary surfaces and thereby pivot the holding wings inward. Lateral edges of the opening into which the two arms are able to be recessed may serve as complementary surfaces. Preferably, the return surfaces are constructed as helical surfaces.

In order to have, even in the case of an oblique installation position of the holding device according to the invention, a horizontal setting-down surface for an inserted drink container, in one embodiment of the invention the pivot arm has such a setting-down surface. The setting-down surface pivots together with the pivot arm. It is arranged at such an angle thereto that it assumes its horizontal position when the pivot arm is upright. The pivot arm and its setting-down surface are preferably of one-piece construction.

A further possibility of having a setting-down surface which is always horizontal consists, according to an embodiment of the invention, of providing the displaceable arm with such a setting-down surface. It can be in one piece with the displaceable arm. Both arms may have a setting-down surface.

The opening of the holding device according to the invention is preferably effected by means of a spring element which engages with the pivot arm and pivots the latter into its upright position. By way of the linkage of the pivot arm to the displaceable arm, the displaceable arm thereby moves into its holding position, the holding wings being pivoted out by their control projections. The pivot arm of the holding device according to the invention is arranged to be locked in its recumbent position, for example by means of a heart-shaped curve control. By means of the pressure on the pivot arm the latter is unlocked and the holding device according to the invention opens into its holding position by itself.

The opening movement of the holding device according to the invention is in one embodiment damped by means of a damping element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
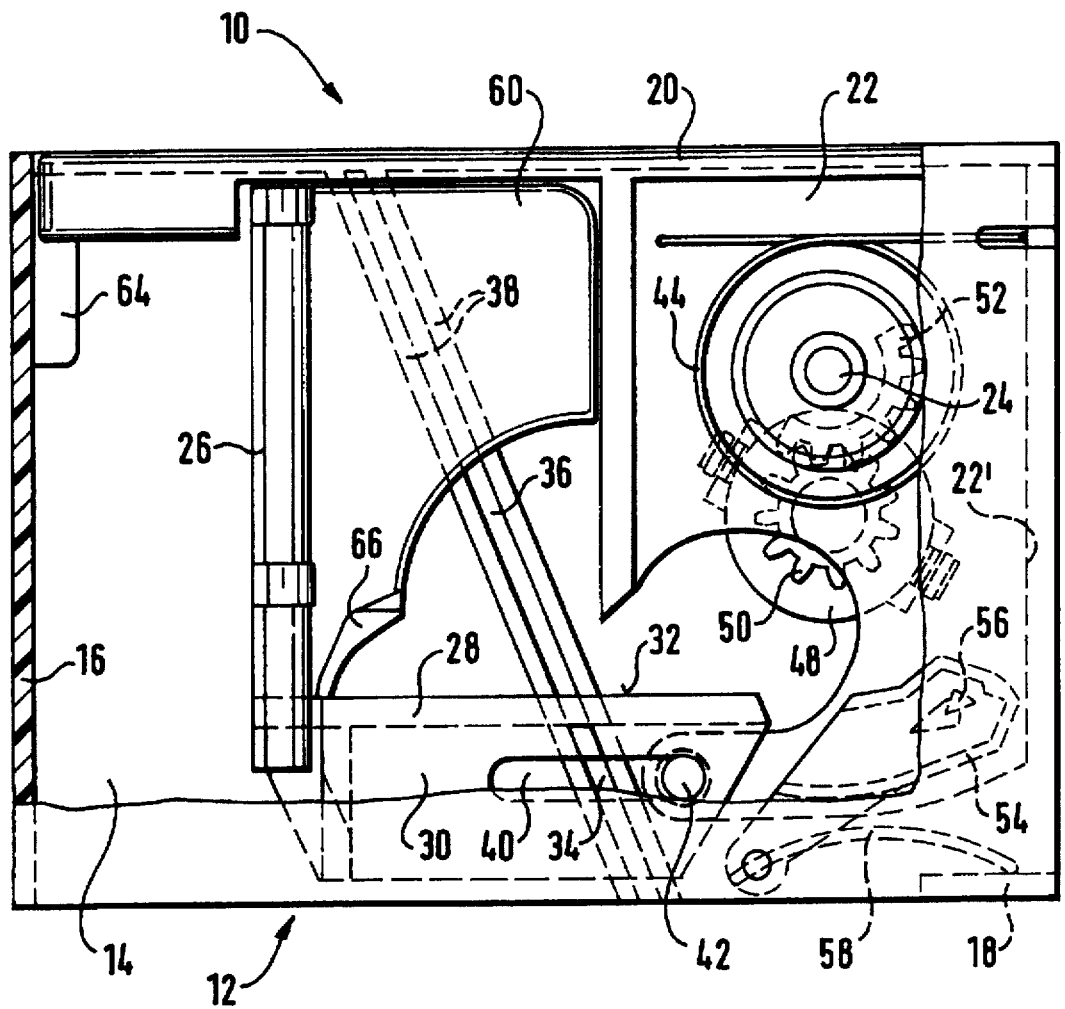
FIG. 1 shows in a side view a holding device according to the invention in the closed position.
Figure 2:
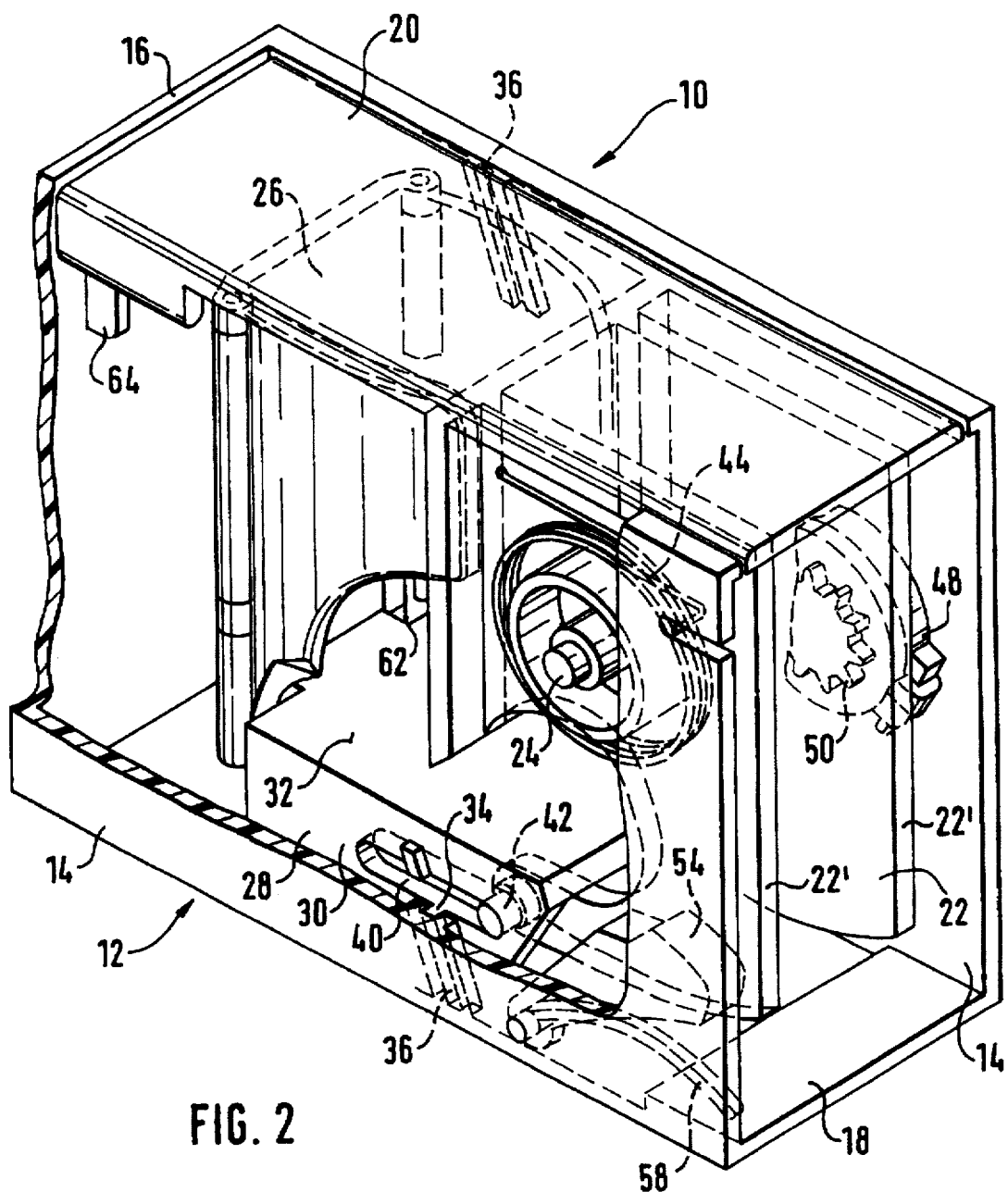
FIG. 2 is a perspective view of the holding device in FIG. 1.

The holding device 10 according to the invention, shown in the closed position in FIGS. 1 and 2, is provided for installation in an approximately horizontal surface of a motor vehicle, for example in the central console. It has a housing 12, produced as an injection-molded part, with two rectangular side walls 14 which are arranged parallel to and at a distance from each other. The two side walls 14 are connected by an end wall 16 and by a strut 18 which is arranged on the underside of the housing 12 on the opposite side from the end wall 16. The upper side, the side opposite the end wall 16, and the underside, with the exception of the strut 18, are open. In order to be able to illustrate the mechanical construction of the holding device 10 according to the invention, the front side wall in the viewing direction in FIGS. 1 and 2 is cut away, so that the view into the inside of the holding device 10 is exposed.

In the housing 12 is mounted a tongue shaped pivot arm 20 which, when the holding device 10 is closed, lies against the upper edge of the housing 12 between the two side walls 14 and thus closes the housing 12 in an upward direction. The pivot arm 20 is an injection-molded part which is L-shaped in side view. At its foot, it merges in one piece into a setting-down surface 22 which is perpendicular to it and which extends inside the housing 12 when the holding device 10 is closed. Integrally adjoining the setting-down surface 22 are two side walls 22 which are arranged parallel to each other within the side walls 14 of the housing 12. By means of two pivot pins 24, which engage in bores in the side walls 14 of the housing 12, the pivot arm 20 is pivotally mounted on the housing 12. The bores to receive the pivot pins 24 of the pivot arm 20 in the side walls 14 of the housing 12 of the holding device 10 according to the invention are arranged at a distance from the free front side and from the upper side of the housing 12.

Beneath the pivot arm 20, when the holding device 10 is closed, there is an upright, tongue-shaped arm 26 that can be displaced upwards. The latter is likewise an injection-molded part which is L-shaped in side view. It merges in one piece into a base part 28 with two side walls 30, which are connected to one another at their upper side in one piece with a setting-down surface 32. These two side walls 30 are arranged within the side walls 14 of the housing 12 in a plane outside the side walls 22 of the pivot arm 20. Each of the two side walls 30 of the base part 28 has a guide rib 34 which is arranged so as to extend obliquely upwards and projects outward. The guide rib is displaceably guided in a straight guide groove 36 which is formed by two ribs 38 which are molded onto inner sides of the side walls 14 of the housing 12. By means of this guide 34, 36, the displaceable arm 26 is held in the housing 12 so as to be displaceable, parallel, in an upward direction.

The side walls 30 of the base part 28 of the displaceable arm 26 each have a horizontal oblong hole 40 in which engages a respective driver pin 42 of the pivot arm 20 which protrudes outward from each of the two side walls 22' of the pivot arm 20.

Figure 3:
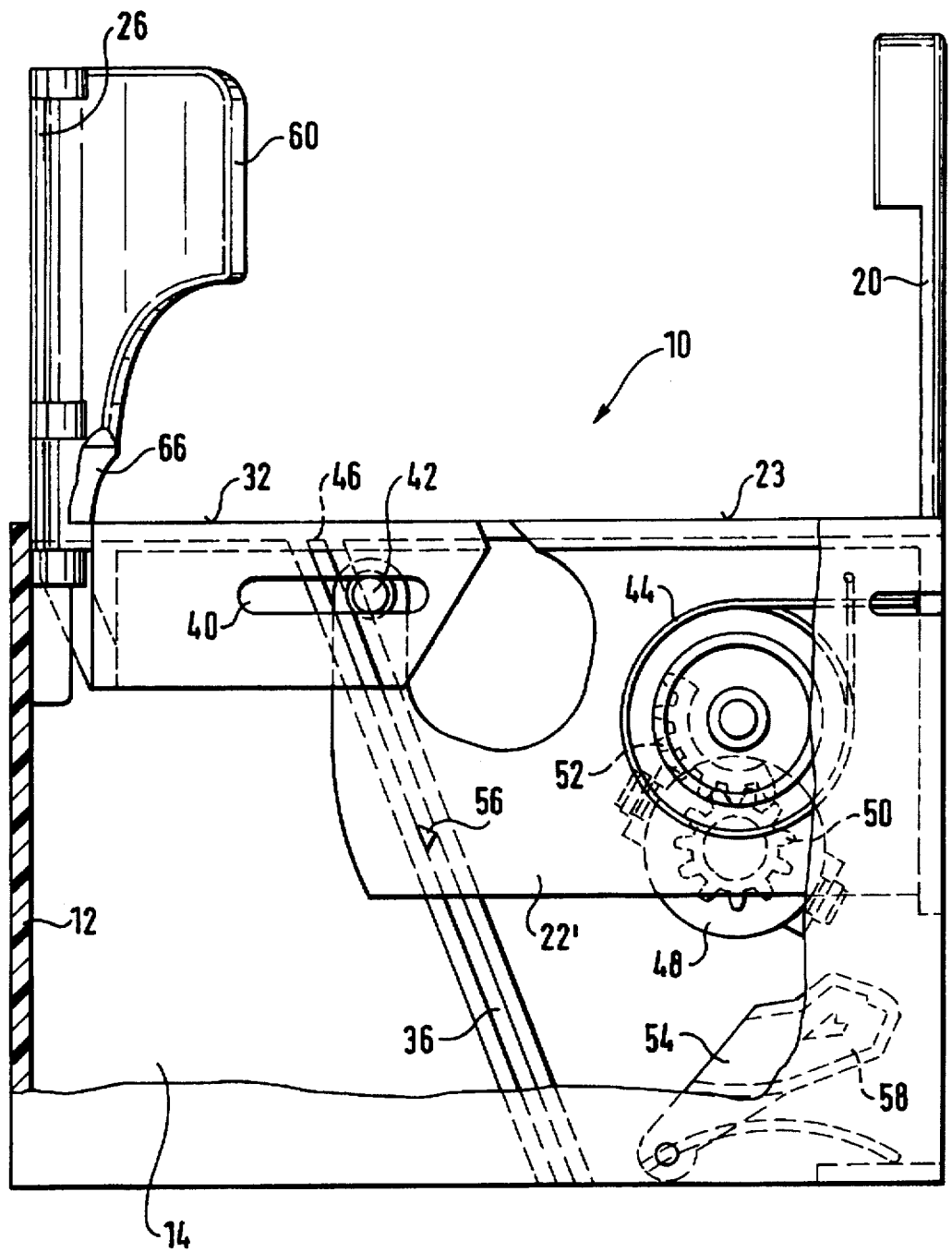
FIG. 3 shows the holding device in FIG. 1 in the open position.
Figure 4:
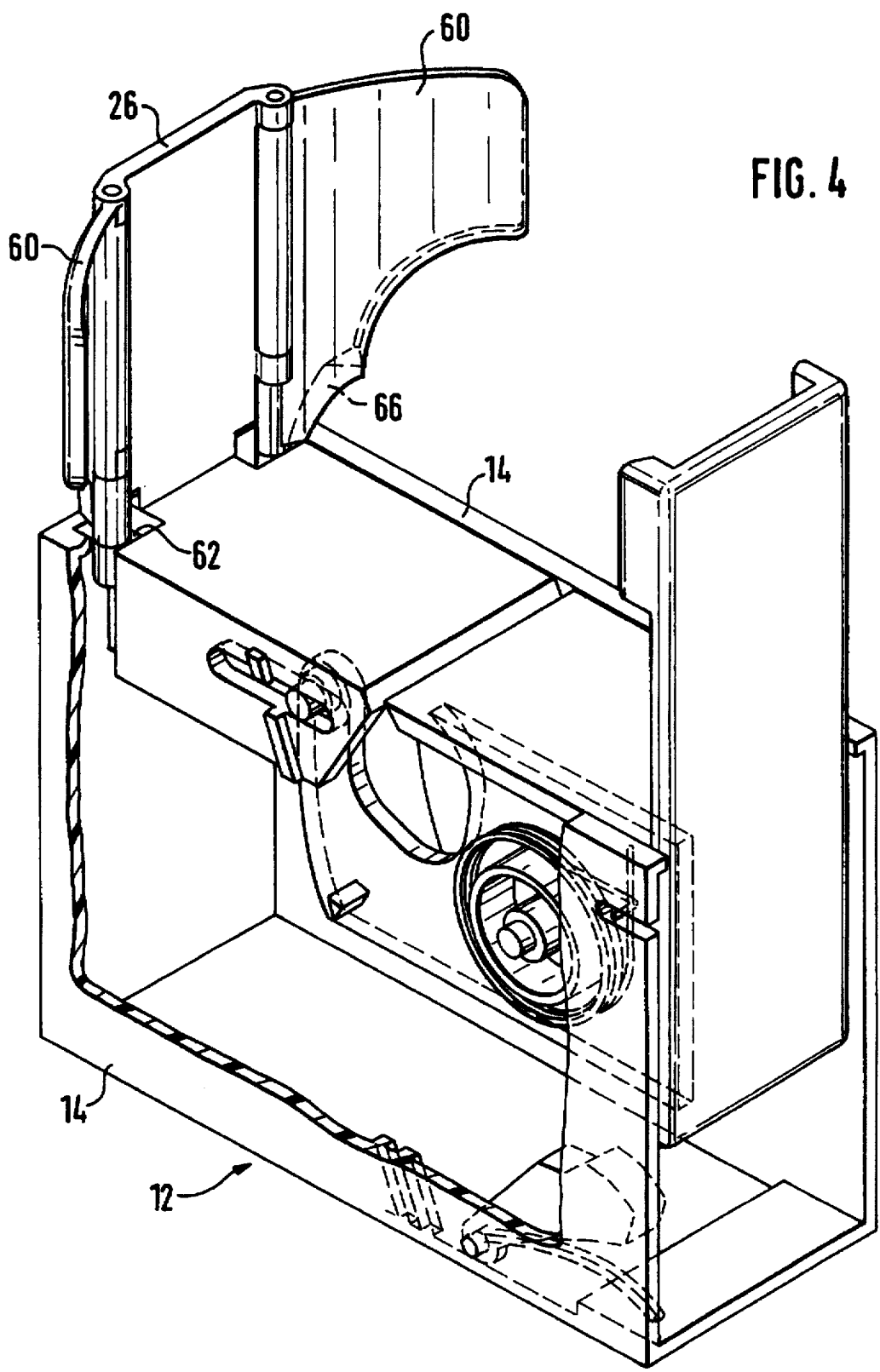
FIG. 4 is a perspective view of the holding device in FIG. 1 in the open position.

To open the holding device 10 according to the invention into the position shown in FIGS. 3 and 4, there is a helical torsion spring 44 which engages with a side wall 14 of the housing 12 and a side wall 22' of the pivot arm 20. The pivot arm 20 pivots, actuated by the spring, into an upright vertical position, and its setting-down surface 23 thereby pivots into a horizontal position. During its pivoting movement, the pivot arm 20 displaces the displaceable arm 26 outward by means of the driver pins 42 which engage in the oblong holes 40 of the displaceable arm 26. The displaceable arm 26 then projects perpendicularly upwards out of the housing 12. It setting-down surface 32 is situated horizontally between the upper edges of the housing 12 and, together with the setting-down surface 23 of the pivot arm 20, closes the housing 12 in an upward direction. The two arms 20, 26 lie parallel opposite each other, and the distance between them is slightly greater than the diameter of a drink container to be inserted into the holding device 10 according to the invention. An end stop 46 in the guide groove 36 limits the opening movement of the arms 20, 26 of the holding device 10 according to the invention.

To damp the movement of the two arms 20, 26 a fluid rotation damper 48 which is known per se is non-rotatably inserted into the rear side wall 14, in FIGS. 1 to 4, of the housing 12. A gearwheel 50, damped in its rotational movement, of the rotation damper 8 engages in a gearwheel segment 52 which is shown by dashed lines in FIG. 1 and which is molded on the outside of the rear side wall 22', not visible, in FIG. 1, of the pivot arm 20.

In order to keep the holding device 10 according to the invention closed against the force of the torsion spring 44, it has a locking device: the locking device has a heart-shaped curve part 54, which is pivotally mounted on a side wall 14 of the housing 12 and in which, when the holding device 10 is locked, there engages a locking pin 56 which protrudes laterally from one of the two side walls 22 of the pivot arm and is triangular in cross-section. A curved spring 58, which bears against the strut 18, connecting the two side walls 14 of the housing 12, holds the heart-shaped curve part 54 resiliently in its position. By pressure from above on the pivot arm 20 which is recumbent when the holding device 10 is closed, the pivot arm is unlocked and the holding device according to the invention opens automatically into the position shown in FIGS. 3 and 4.

On both sides of the displaceable arm 26 there are pivotally mounted two holding wings 60 which, when the holding device 10 is closed, extend within the side walls 14 of the housing 12 in the direction of the open front side of the housing 12. At their lower end, the holding wings 60 have control projections 62 (FIGS. 2 and 4) which protrude radially from their pivot axes and which, during the upward displacement of the displaceable arm 26, come to bear against the ribs 64 which are integrally mounted on the inner side in the upper region of the end wall 16 of the housing 12. While sliding along on these ribs 64, the holding wings 60 are pivoted outward into a position in which they lie approximately in the peripheral direction of a drink container to be inserted into the holding device 10 according to the invention.

For pivoting-in, portions of the lower edges of the holding wings 60 are constructed helically as return surfaces 66 which, during the displacement of the displaceable arm 26 downwards into the housing 12, come to bear against upper edges of the side walls 14 of the housing 12 and thereby pivot the holding wings 60 inward during the downward movement.

Figure 5:
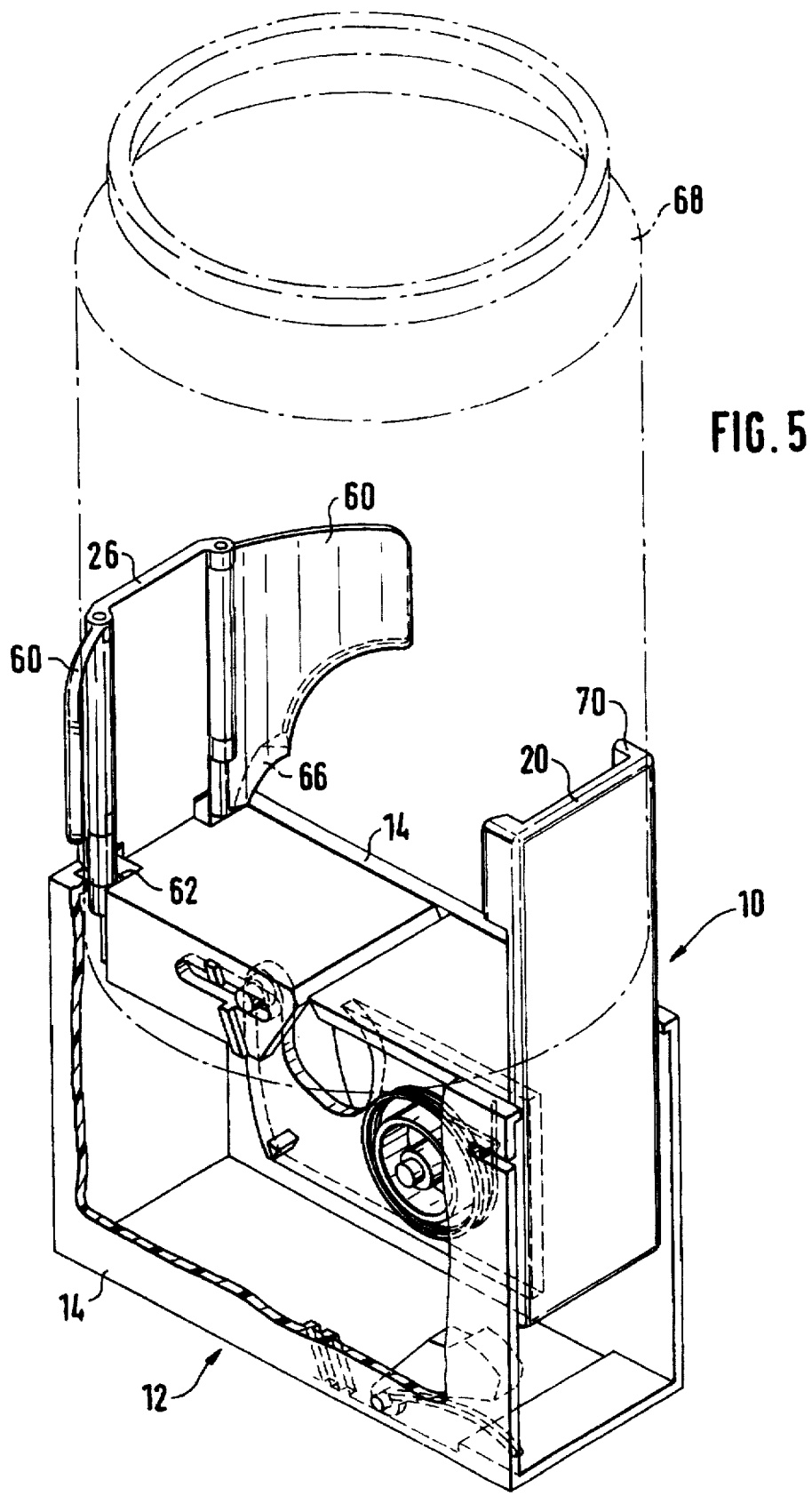
FIG. 5 is a perspective view of a drink can inserted into the holding device according to the invention.

In FIG. 5, the holding device 10 according to the invention is illustrated with a drink can 68 inserted into it as the drink container. The displaceable arm 26 with the holding wings 60 engages round a portion of the periphery of the drink can 68, over a relatively large angle. On the opposite side, the pivot arm 20 holds the drink can 68. For this purpose it has in its upper region two ribs 70 protruding in the direction of the drink can 68. Molded onto these ribs 70 is a rubber-like coating with which the ribs 70 bear against the drink can 68.

Especially by means of the holding wings 60 pivoting out, the drink can 68 is surrounded on sufficiently large portions of the periphery to hold it securely, although the construction width of the holding device 10 according to the invention amounts to approximately only a third of the diameter of the drink can 68.

It will be understood that each of the elements described above, or two or more together, may also find a useful application in other types of constructions differing from the types described above.

While the invention has been illustrated and described as embodied in a holding device for drink container, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A holding device for a drink container, comprising a pivot arm pivotable from a recumbent position into an upright position and in said upright position surrounding a portion of a periphery of a drink container; and a displaceable arm guided so as to be displaceable from a recessed position into a holding position in which said displaceable arm stands opposite to said pivot arm and surrounds an opposite portion of the periphery of the drink container, said arms being linked with each other so that said pivot arm during its pivoting movement into said upright position raises said displaceable arm into said holding position, said displaceable arm having holding wings pivotable outward in said upright position.

2. A holding device as defined in claim 1; and further comprising a guide in which said displaceable arm is guided.

3. A holding device as defined in claim 2, wherein said pivot arm is pivotable about a pivot axis, said displaceable arm being displaceable in a displacement path, said guide being formed so that in the center of said displacement path of said displaceable arm said guide extends tangentially to said pivot axis of said pivot arm.

4. A holding device as defined in claim 1; and further comprising control means including a control rib, and control projections provided on said holding wings so that during a displacement of said displaceable arm into said holding position said control projections slide along said control in said position of the holding device and thereby pivot said holding wings outward.

5. A holding device as defined in claim 1; and further comprising means forming fixed complementary surfaces, said holding wings having lower edges with torsions formed as return surfaces which, during the displacement of said displaceable arm into the recessed position, slide along said fixed complementary surfaces and thereby pivot said holding wings inward.

6. A holding device as defined in claim 5, wherein said return surfaces are formed as helical surfaces.

7. A holding device as defined in claim 1, wherein said pivot arm has a setting-down surface pivoting together with said pivot arm for the drink container inserted in the holding device, said setting-down surface moving into a horizontal position during the pivoting of said pivot arm into said upright position.

8. A holding device as defined in claim 1, wherein said displaceable arm has a setting-down surface for a drink container inserted into the holding device, said setting-down surface being displaced together with said displaceable arm and assuming a horizontal position in said holding position of said displaceable arm.

9. A holding device as defined in claim 1; and further comprising a spring arranged so that said pivot arm is actuated by said spring to pivot into said upright position; and a locking device formed so that said locking device locks said pivot arm in said recumbent position.

10. A holding device as defined in claim 1; and further comprising a damping element formed so as to damp with pivoting movement and a displacement movement of said arms.

* * * * *